United States Patent
Ravichandran et al.

(10) Patent No.: US 11,569,884 B2
(45) Date of Patent: Jan. 31, 2023

(54) OPPORTUNISTIC OUT-OF-LINK CHANNEL SOUNDING FOR MULTI-LINK DEVICES

(71) Applicant: Cisco Technology, Inc., San Jose, CA (US)

(72) Inventors: Arunkumar Ravichandran, Milpitas, CA (US); Pooya Monajemi, Irvine, CA (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 44 days.

(21) Appl. No.: 17/116,975

(22) Filed: Dec. 9, 2020

(65) Prior Publication Data
US 2022/0182119 A1 Jun. 9, 2022

(51) Int. Cl.
*H04L 12/26* (2006.01)
*H04B 7/06* (2006.01)
*H04W 76/15* (2018.01)
*H04L 5/00* (2006.01)

(52) U.S. Cl.
CPC ......... *H04B 7/0626* (2013.01); *H04B 7/0617* (2013.01); *H04L 5/0051* (2013.01); *H04W 76/15* (2018.02)

(58) Field of Classification Search
CPC ..... H04L 47/10; H04L 43/50; H04L 12/2697; H04L 43/0852; H04L 43/00; H04L 5/0051; H04B 7/0626; H04B 7/0617; H04W 76/01
See application file for complete search history.

(56) References Cited

U.S. PATENT DOCUMENTS

| | | | |
|---|---|---|---|
| 2016/0165607 A1* | 6/2016 | Hedayat | H04W 52/0229 370/338 |
| 2016/0262051 A1* | 9/2016 | Merlin | H04W 72/0413 |
| 2018/0054832 A1 | 2/2018 | Luo et al. | |
| 2019/0132762 A1 | 5/2019 | Zhu et al. | |
| 2019/0140709 A1* | 5/2019 | Guerra | H04L 25/0224 |
| 2020/0136700 A1 | 4/2020 | Bogale et al. | |
| 2020/0403680 A1* | 12/2020 | Li | H04B 7/024 |
| 2021/0184743 A1* | 6/2021 | Vermani | H04B 7/0626 |
| 2021/0266890 A1* | 8/2021 | Chu | H04W 72/048 |

(Continued)

OTHER PUBLICATIONS

Oscar Bejarano, et al., MUTE: Sounding Inhibition for MU-MIMO WLANs, IEE, Dec. 2014, 9 pages.
Xiaofu Ma, et al., Dynamic Sounding for Multi-User MIMO in Wireless LANs, IEEE Transactions on Consumer Electronics, Jul. 20, 2017, 10 pages.

(Continued)

*Primary Examiner* — Phuongchau Ba Nguyen
(74) *Attorney, Agent, or Firm* — Merchant & Gould P.C.

(57) ABSTRACT

Out-of-link channel sounding using an out-of-band channel sounding link for multi-link devices (MLDs) in a wireless network may be provided. An Access Point (AP) may establish a first Wireless Communication Link (WCL) with a Multi-link Device (MLD). The AP may also establish a second WCL with the MLD. After establishing the first WCL, the AP may transmit a sounding trigger to the MLD on the first WCL. After transmission of the sounding trigger to the MLD on the first WCL, AP may transmit a Channel State Information (CSI) inquiry to the MLD on the second WCL. AP may receive a channel state quantification from the MLD on the second WCL in response to the CSI inquiry.

17 Claims, 6 Drawing Sheets

(56) References Cited

U.S. PATENT DOCUMENTS

2021/0266891 A1* 8/2021 Chu .................. H04W 74/00
2021/0377928 A1* 12/2021 Seok .................. H04L 69/324

OTHER PUBLICATIONS

Ryan E. Guerra, et al., Opportunistic Channel Estimation for Implicit 802.11af MU-MIMO, 2016 28th International Teletraffic Congress (ITC 28), Sep. 2016, 9 pages.

Toshihisa Nabetani, et al., A Novel Low-Overhead Channel Sounding Protocol for Downlink Multi-User MIMO in IEEE 802.11ax WLAN, IEICE Trans. Commun., vol. E101-B, No. Mar. 3, 2018, 9 pages.

Nuria Gonzalez-Prelcic, et al., Millimeter-Wave Communication with Out-of-Band Information, IEEE, May 2017, 14 pages.

Huawei, Empowering Consumer-Focused Immersive VR and AR Experiences with Mobile Broadband, Cross-Industry Whitepaper Series: Empowering Our Connected World, 2016, 10 pages.

Evgeny Khorov, et al., Current Status and Directions of IEEE 802.11be, the Future Wi-Fi 7, IEEE Access, vol. 8, 2020, May 8, 2020, 25 pages.

Nizabat Khan, Multi-Link Channel Modeling and Interference Characterization for Beyond 4G Networks, Thèse (Dissertation) uclouvain.be, Jun. 2014, 189 pages.

Cailian Deng, et al., IEEE 802.11be—Wi-Fi 7: New Challenges and Opportunities, arxiv.org/abs/2007.13401, Aug. 3, 2020, 30 pages.

Feng Jiang (Intel Corporation): "Channel Sounding for Multi-AP CBF", IEEE Draft, vol. 802.11 EHT; 802.11be, No. 2 Jul. 9, 2020, pp. 1-15.

Cailian Deng et al: "IEEE 802.11be—Wi-Fi 7: New Challenges and Opportunities", arxiv.org, Cornell University Library, 201 Olin Library Cornell University Ithaca, NY 14853, Aug. 3, 2020, XP081732662.

Khorov Evgeny et al: "Current Status and Directions of IEEE 802.11be, the Future Wi-Fi 7", IEEEACCESS, IEEE, USA, vol. 8, May 8, 2020, pp. 88664-88688.

Zhou Pei et al: "Multi-Beam Transmission and Dual-Band Cooperation for Control/Data Plane Decouples WLANs", IEEE Transactions on Vehicular Technology, IEEE, USA, vol. 68, No. 10, Oct. 1, 2019, pp. 9806-9819.

International search Report and Written Opinion issued in corresponding International Patent Application No. PCT/US2021/062029, dated Mar. 30, 2022.

* cited by examiner

OPPORTUNISTIC OUT-OF-LINK CHANNEL SOUNDING FOR MULTI-LINK DEVICES

TECHNICAL FIELD

The present disclosure relates generally to wireless networking with multi-link wireless devices.

BACKGROUND

Institute of Electrical and Electronics Engineers (IEEE) 802.11 is part of the IEEE 802 Local Area Network (LAN) protocols. Channel sounding is an integral part of IEEE 802.11 operation that is performed before various types of wireless transmissions. Channel sounding is required for Multi-User Multiple Input Multiple Output (MU-MIMO) applications and Single-User Multiple Input Multiple Output (SU-MIMO) applications. During channel sounding, channel measurements need to be performed frequently to determine a channel state and provide quality of service.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Out-of-link channel sounding using a secondary or alternate channel sounding link for Multi-Link Devices (MLDs) in a wireless network may be provided. An Access Point (AP) may establish a first Wireless Communication Link (WCL) with a MLD. The AP may also establish a second WCL with the MLD. After establishing the first WCL, the AP may transmit a sounding trigger to the MLD on the first WCL. After transmission of the sounding trigger to the MLD on the first WCL, AP may transmit a Channel State Information (CSI) inquiry to the MLD on the second WCL. AP may receive a channel state quantification from the MLD on the second WCL in response to the CSI inquiry.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Channel sounding is typically performed in Wi-Fi networks to determine a wireless communication channel state before various types of transmissions between Access Points (APs) and wireless client devices of the network, including Multi-User Multiple Input Multiple Output (MU-MIMO) and Single User Multiple Input Multiple Output (SU-MIMO). As one example, for distributed MIMO used as part of multi-AP coordination or MIMO with 16 Spatial Streams (SSs) proposed in Institute of Electrical Engineers (IEEE) 802.11be, frequent channel sounding is needed to gain knowledge of the channel state. However, frequently performing channel measurements while channel sounding introduces additional channel traffic and increases latency in the wireless network, which may result in wireless performance degradation and reduced quality of service, particularly for time sensitive applications executing on the client devices. As an example, the time allocated to channel sounding for 8 stations in MU-MIMO operation may be as high as 7 milliseconds (ms), which would be detrimental for time sensitive applications, such as virtual reality applications in which latency is to be within about 5 to 9 ms. This additional overhead introduced into a Wireless Communication Link (WCL) by the channel sounding process is a technical problem that, if not addressed, may lead to increased latency in the wireless network and reduced application responsiveness that may result in degraded quality of service.

IEEE 802.11be discloses Wi-Fi standards that further enhance capabilities of wireless devices (e.g., IEEE 802.11ax devices) currently on the market. For example, a Multi-Link Device (MLD) can include multiple radios and antennas which may provide a capability of simultaneous operation on multiple channels. To take advantage of the multi-radio devices, multi-link operation (MLO) provides a framework to enable packet-level aggregation at the media access control (MAC) layer so that frames from a single traffic session, such as video frames for example, can be sent on multiple links. IEEE 802.11, uses the term "link" to refer to a unique wireless channel.

As described below, the multi-link protocols provided by IEEE 802.11be may be leveraged to address the technical problems associated with latency introduced by single link channel sounding methodologies. The present disclosure provides technical solutions that may be used in a multi-link system to reduce an amount of latency introduced by channel sounding on a single WCL and thereby improve or maintain quality of service of the wireless network.

Embodiments of the disclosure utilize an out-of-band channel link (also referred to as a dedicated channel sounding link) to perform channel sounding between an AP and one or more MLDs in a multi-link communication environment. For example, a single AP may establish multiple links with a single MLD and use one of the established links as a dedicated link for channel sounding operations. By using a dedicated channel sounding link for channel sounding operations between an AP and an MLD, latency associated with the communication link that is being used for uplink and downlink data communications may be reduced. Accordingly, one technical solution may realize improved throughput and quality of service for an MLD by reducing the latency associated with at least one communication link in a wireless network.

Figure 1:
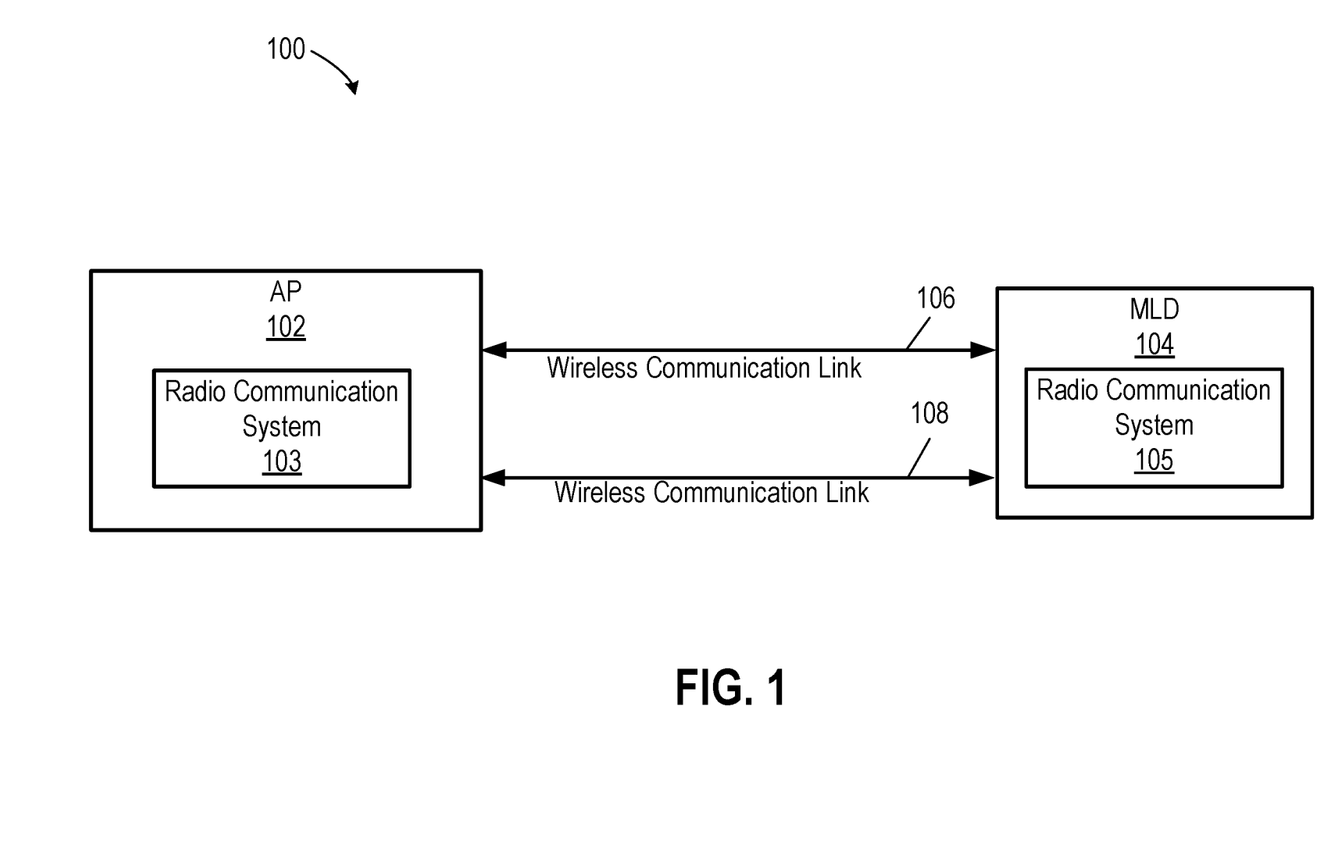
FIG. 1 is a block diagram of wireless network.
Figure 4:
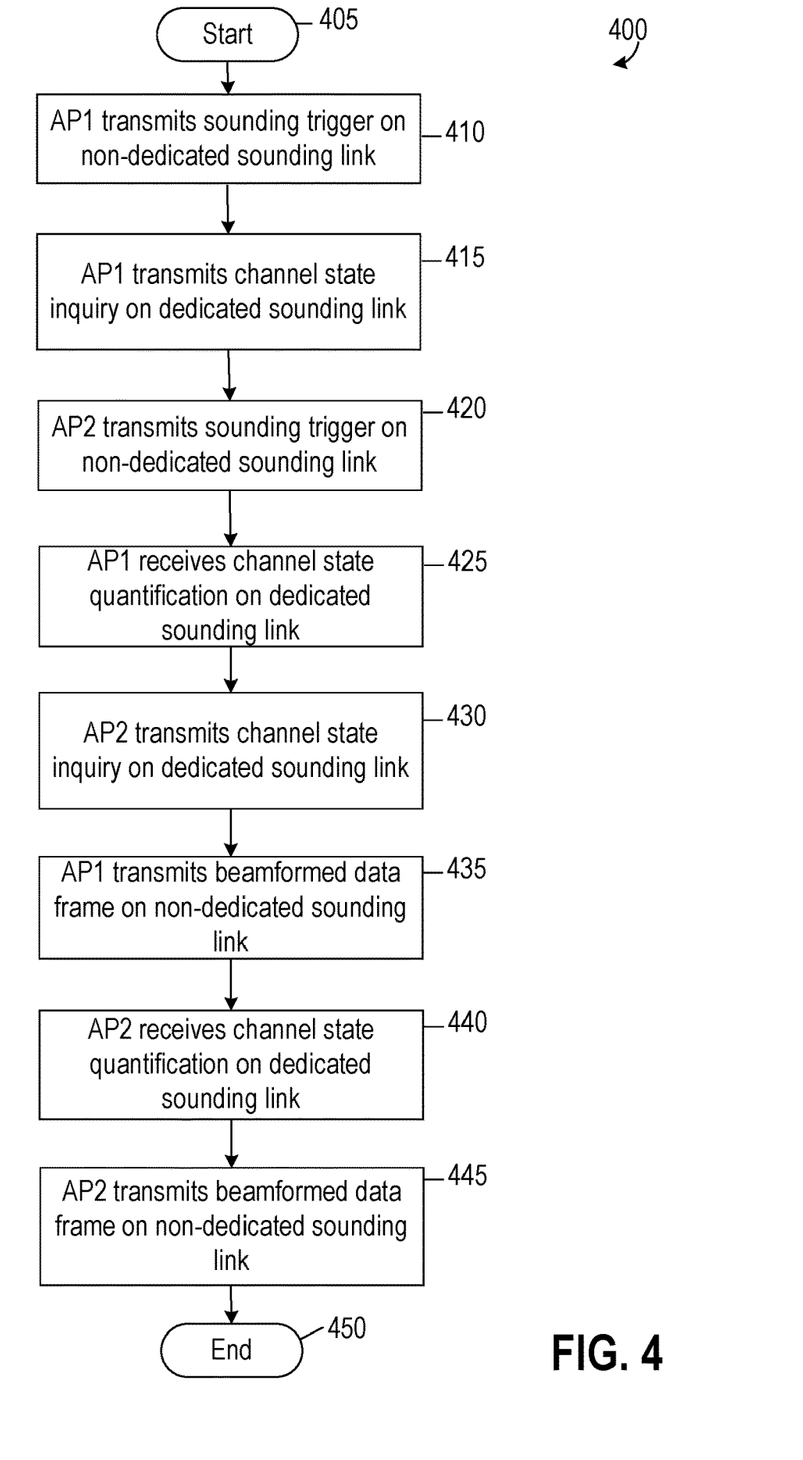
FIG. 4 is a flow chart of a method for multi-Access Point (AP) channel sounding in a multi-link wireless environment.
Figure 5:
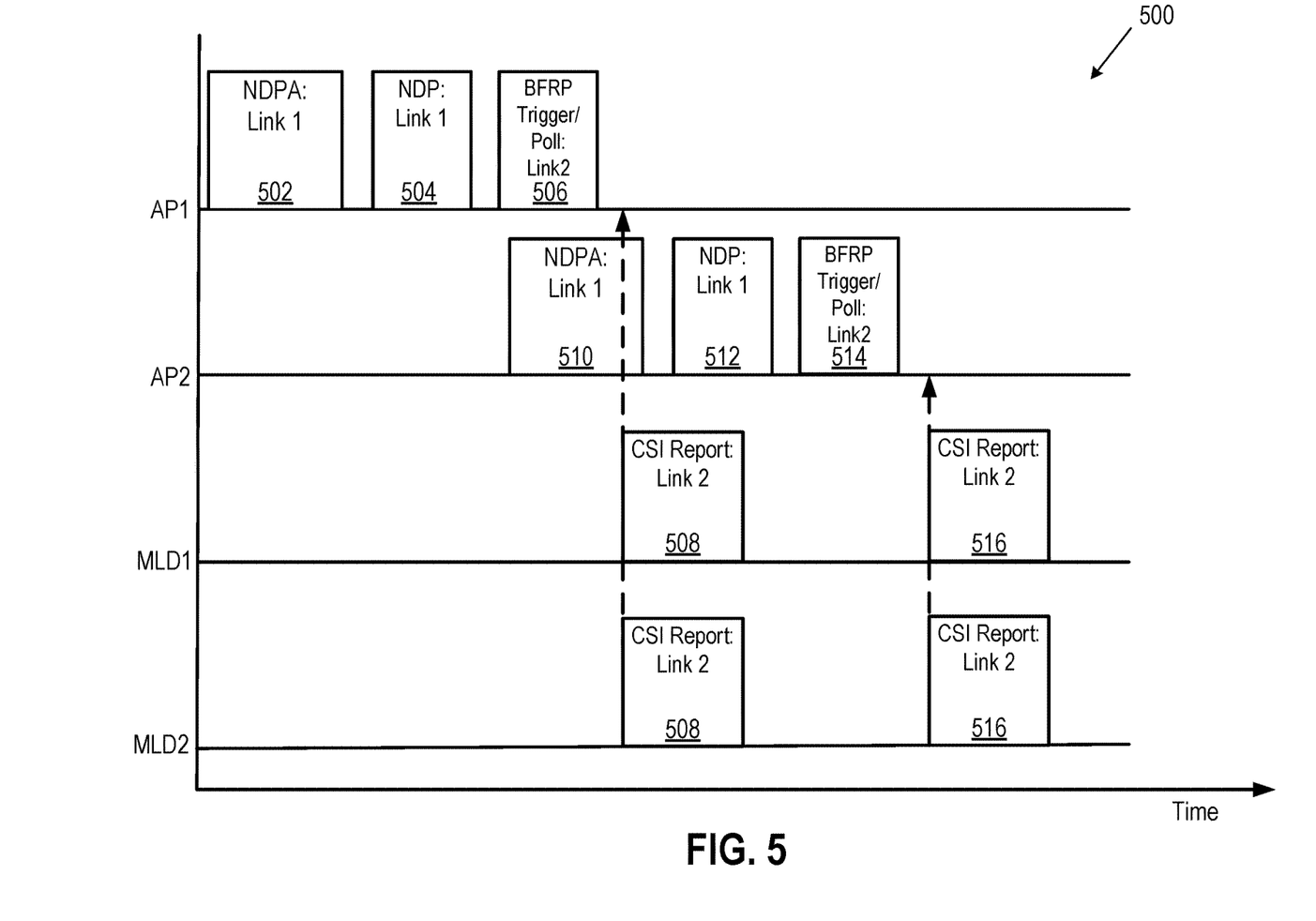
FIG. 5 is a transmission sequence for an exemplary multi-AP channel sounding process in a wireless network.

FIG. 1 shows a block diagram of wireless network 100 for providing channel sounding for MLDs. As shown in FIG. 1, wireless network 100 includes at least one AP 102 and at least one MLD 104. However, the wireless network 100 is not so limited and may include multiple APs and multiple MLDs (e.g., as shown in FIGS. 4 and 5). AP 102 may be currently associated with one or more MLDs, including MLD 104. An exemplary AP 102 includes an integrated radio communication system 103 that includes a plurality of radios and antennas. Likewise, MLD 104 includes an integrated radio communication system 105 having a plurality of radios and antennas. Each radio communication system 103, 105 is operable to communicate on multiple wireless links or channels. AP 102 and MLD 104 can use the respective integrated radio communication systems 103, 105 to establish communication over a wireless network 100 (e.g., a Wireless Local Area Network (WLAN)).

As shown in FIG. 1, and as one example, a first WCL 106 and a second WCL 108 have been established between AP 102 and MLD 104 according to the 802.11 wireless protocol. In some cases, depending on the capabilities of AP 102 and MLD 104, it may be possible to utilize multiple spatial streams (e.g., 4, 8, 16, etc.) to communicate within wireless network 100. AP 102 may be a networking hardware device that enables other devices, such as MLD 104, to connect to network 100. As an example, AP 102 can be configured with a multi-radio software controller for use with Long Term Evolution (LTE), Wireless Fidelity (Wi-Fi), Worldwide Interoperability for Microwave Access (WiMAX), Global System for Mobile Communications (GSM), Code Division Multiple Access (CDMA), Wideband Code Division Multiple Access (WCDMA), etc. that includes N (e.g., 2, 4, 8, 16, etc.) independent 2×2 transceivers, N independent two channel receivers or sniffers, a radio frequency band from about 70 Megahertz (MHz) to about 6 Gigahertz (GHz), and a tunable channel bandwidth.

In other embodiments of the disclosure, rather than APs, devices may be used that may be connected to a cellular network that may communicate directly and wirelessly with user devices (e.g., MLD 104) to provide access to wireless network 100 (e.g., Internet access). For example, these devices may comprise, but are not limited to, eNodeBs (eNBs) or gNodeBs (gNBs). A cellular network may comprise, but is not limited to, an LTE broadband cellular network, a Fourth Generation (4G) broadband cellular network, or a Fifth Generation (5G) broadband cellular network, operated by a service provider. Notwithstanding, embodiments of the disclosure may use wireless communication protocols using, for example, Wi-Fi technologies, cellular networks, or any other type of wireless communications.

MLD 104 may comprise, but is not limited to, an AP, a phone, a smartphone, a digital camera, a tablet device, a laptop computer, a personal computer, a mobile device, a sensor, an Internet-of-Things (IoTs) device, a cellular base station, a telephone, a remote control device, a set-top box, a digital video recorder, a cable modem, a network computer, a mainframe, a router, or any other similar microcomputer-based device capable of accessing and using a Wi-Fi network.

Components of wireless network 100 may be practiced in hardware and/or in software (including firmware, resident software, micro-code, etc.) or in any other circuits or systems. The elements of wireless network 100 may be practiced in electrical circuits comprising discrete electronic elements, packaged or integrated electronic chips containing logic gates, a circuit utilizing a microprocessor, or on a single chip containing electronic elements, radio elements, or microprocessors. Furthermore, the components of wireless network 100 may also be practiced using other technologies capable of performing logical operations such as, for example, AND, OR, and NOT, including but not limited to, mechanical, optical, fluidic, and quantum technologies. As described in greater detail below with respect to FIG. 6, aspects of wireless network 100 may be practiced in a computing device 600.

Figure 2:
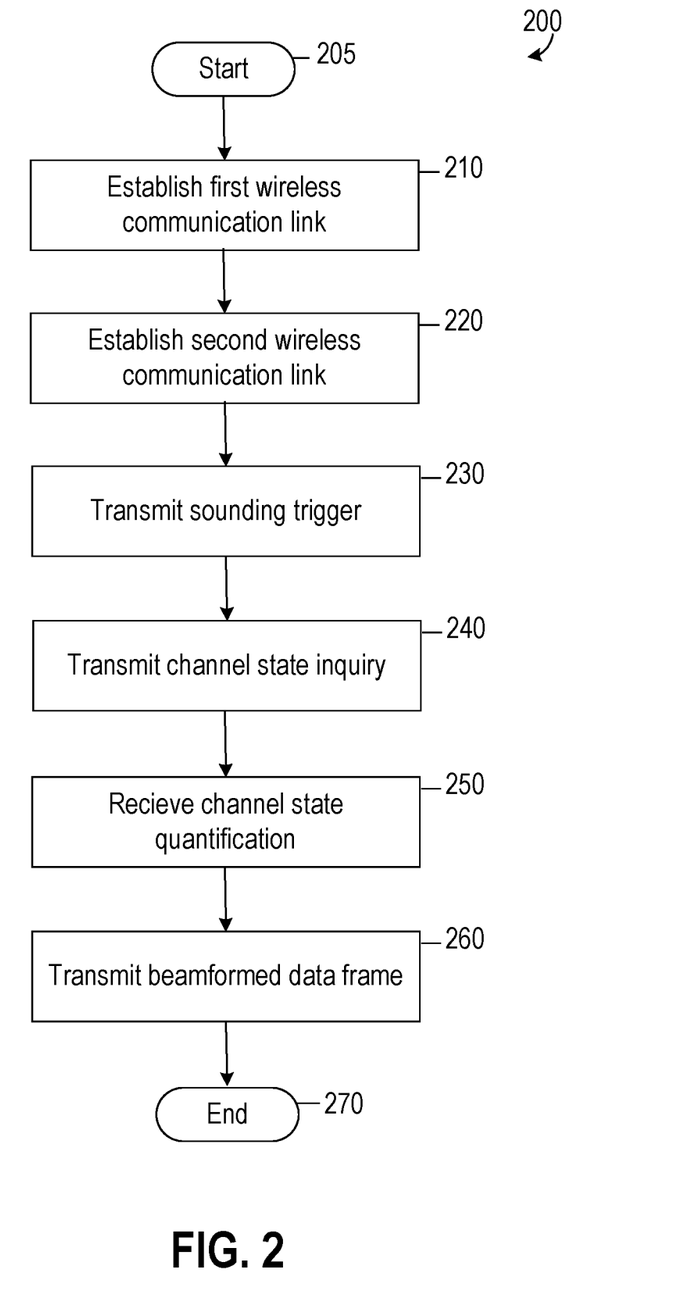
FIG. 2 is a flow chart of a method for channel sounding in a multi-link wireless environment.

FIG. 2 is a flow chart setting forth the general stages involved in a method 200 for channel sounding in a multi-link wireless environment, such as the multi-link wireless environment described in FIG. 1. Method 200 begins at block 205 and proceeds to stage 210 where AP 102 utilizes its radio communication system 103 to establish first WCL 106 with MLD 104. At stage 220, AP 102 utilizes radio communication system 103 to establish second WCL 108 with MLD 104. For example, AP 102 can operate according to the IEEE 802.11be protocol to establish multiple wireless links with MLD 104 as part of utilizing second WCL 108 as a dedicated channel sounding link when channel sounding. For this example, per IEEE 802.11 channel contention protocol, AP 102 wins contention in second WCL 108 which is available for downlink transmission and channel sounding with MLD 104.

At stage 230, AP 102 transmits a sounding trigger to MLD 104 on first WCL 106. For example, AP 102 may transmit a Null Data Packet Announcement (NDPA) and Null Data Packet (NDP) frame (e.g., NDPA/NDP frame) to MLD 104 on first WCL 106 to alert MLD 104 of the initiation of channel sounding. At stage 240, AP 102 transmits a channel state information (CSI) inquiry to MLD 104 on second WCL 108. For example, at stage 240, AP 102 may transmit a Compressed Beam Forming Report (CBFR) poll frame to MLD 104 on second WCL 108.

At stage 250, AP 102 receives a channel state quantification on second WCL 108 from MLD 104 in response to the CSI inquiry. For example, at stage 250, AP 102 may receive a CBFR frame with beamforming parameters on second WCL 108 from MLD 104 in response to the CBFR poll frame transmitted on second WCL 108. At stage 260, after receiving the channel state quantification from MLD 104 on second WCL 108, AP 102 transmits a data frame to MLD 104 on first WCL 106. For example, at stage 260, AP 102 may transmit a beamformed data frame to MLD 104 tailored according to the channel state quantification received from MLD 104. Method 200 ends at stage 270.

Method 200 may reduce an amount of latency associated with wireless network 100 by using second WCL 108 as a dedicated channel sounding link to perform channel sounding and thereby reduce traffic and latency on first WCL 106. Additionally, AP 102 may be involved in multi-link communication with more than one MLD, and may communicate with different MLDs over a same link (e.g., first WCL 106) adding additional traffic on the first WCL 106. Accordingly, by using an alternate wireless link for channel sounding, AP 102 may use first WCL 106 to transmit data frames to one or more different MLDs over first WCL 106 without attributing additional channel sounding overhead on first WCL 106.

Figure 3:
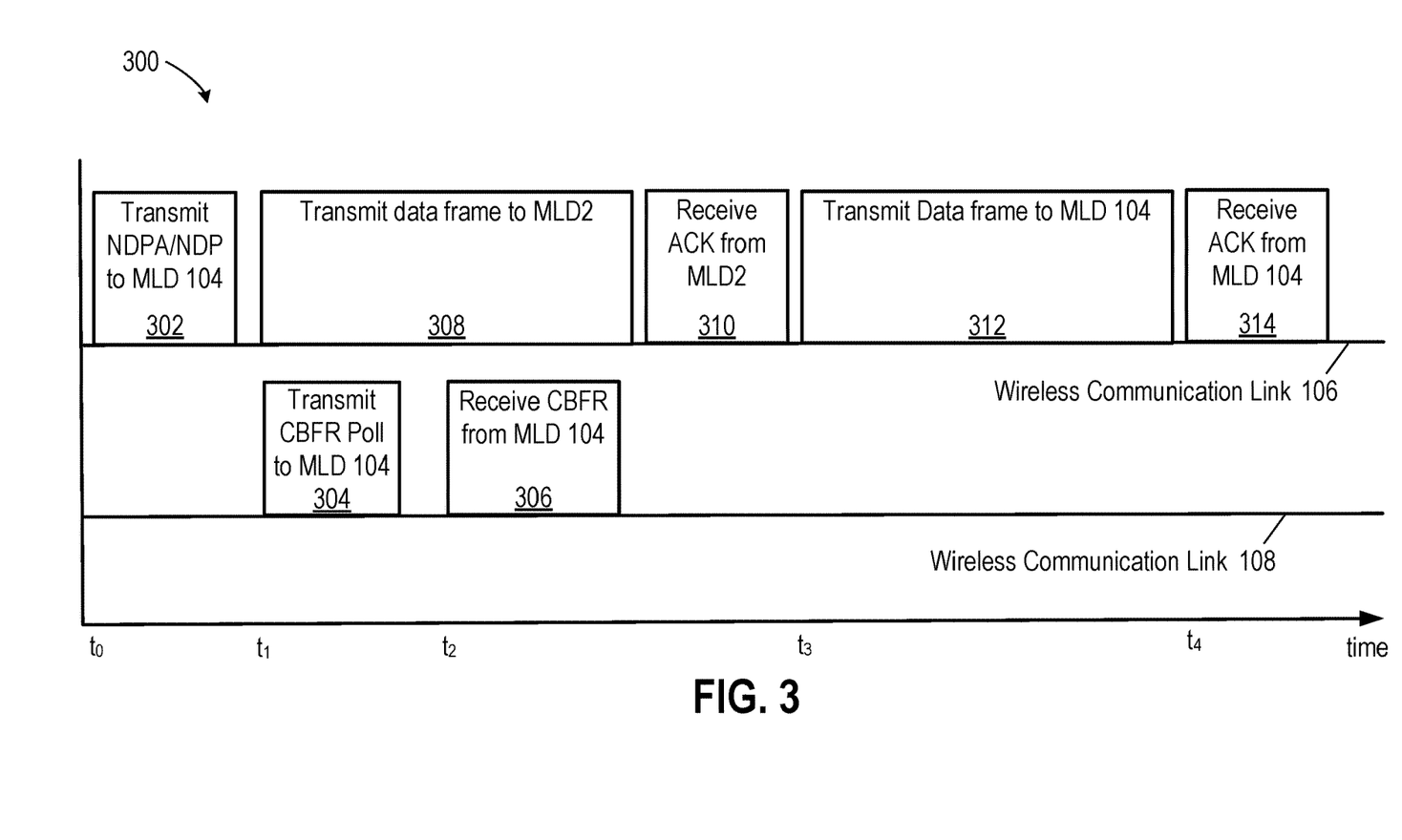
FIG. 3 illustrates a transmission sequence of an exemplary channel sounding process in a multi-link wireless network.

FIG. 3 illustrates a transmission sequence 300 of an exemplary channel sounding process in multi-link wireless network 100. As shown for this example, AP 102 is communicating with MLD 104 on first WCL 106 and second WCL 108. AP 102 is also communicating with a second MLD (MLD2) on first WCL 106. As shown in FIG. 3, at to, AP 102 transmits a sounding trigger to MLD 104 on first WCL 106. For example, at to, AP 102 may transmit NDPA/NDP frame 302 to MLD 104 on first WCL 106 to initiate channel sounding.

At $t_1$, AP 102 transmits a CSI inquiry to MLD 104 on second WCL 108. For example, at $t_1$, AP 102 may transmit CBFR poll frame 304 on second WCL 108 to MLD 104. At $t_2$, AP 102 receives a channel state quantification on second WCL 108 from MLD 104 in response to CBFR poll frame 304. For example, at $t_2$, AP 102 may receive a CBFR frame 306 on second WCL 108 from MLD 104 in response to the CBFR poll frame 304 transmitted by AP 102 on second WCL 108.

As shown in the example transmission sequence 300 of FIG. 3, AP 102 may also utilize first WCL 106 to transmit a data frame 308 to MLD2 while performing channel sounding with MLD 104 on second WCL 108. That is, because AP 102 is performing channel sounding with MLD 104 on second WCL 108, AP 102 is able to utilize the first WCL 106 to send data frames to MLD2 on first WCL 106. Data frame 308 may be tailored based on a similar CSI inquiry/quantification described for MLD 104 that was performed prior to the CSI inquiry/quantification for MLD 104. AP 102 receives an acknowledgement 310 (e.g., block ACK) from MLD2 on first WCL 106 in response to the transmitted data frame 308.

After receiving the channel state quantification from MLD 104 on second WCL 108 and/or acknowledgement 310 from MLD2, at $t_3$, AP 102 transmits a data frame 312 to MLD 104 on first WCL 106. At $t_4$, AP 102 receives an acknowledgement 314 (e.g., block ACK) from MLD 104 on first WCL 106 in response to the transmitted data frame 312. As shown in FIG. 3, performing channel sounding on second WCL 108 may result in reduced channel traffic on first WCL 106 in addition to a reduction of an amount of latency attributed to first WCL 106.

Transmission sequence of FIG. 3 may be utilized in various exemplary use cases. A first example use case assumes that Downlink (DL) traffic is limited to transmission in first WCL 106. For instance, even though MLD 104 can operate on both WCLs 106, 108, MLD 104 traffic belongs to a traffic identifier (TID) that is only mapped to first WCL 106. In this case, MLD 104 may have more spatial streams available in first WCL 106 as compared to second WCL 108, providing advantages to use first WCL 106 for DL transmission.

Another example use case entails presence of time-sensitive traffic in first WCL 106 for MLD 104 and time-sensitive traffic in first WCL 106 for MLD2. For example, two scenarios may occur when traffic of MLD2 is only available on first WCL 106 and is latency-sensitive. The first scenario entails where traffic of MLD2 can wait for the duration of the NDPA/NDP frame of MLD 104 but cannot be postponed beyond the DL transmission sequence for MLD 104 (e.g., frames 312/314 in FIG. 3). The second scenario entails when MLD2 is expected to wake up shortly (e.g., for Target Wake Time (TWT)), however AP 102 has already won contention on first WCL 106 slightly earlier in time for the NDPA/NDP frame 302 to MLD 104.

FIG. 4 is a flow chart setting forth the general stages involved in a method 400 for multi-AP channel sounding. For example, multi-AP channel sounding can be used in a multi-link wireless environment that includes a first AP (AP1) and a different communication source (e.g., second AP (AP2)) forming a wireless network with a first multi-link device (MLD1) and a second multi-link device (MLD2). AP1 and AP2 may be similar devices to AP 102 described with reference to FIG. 1. MLD1 and MLD2 may be similar devices to MLD 104 described with reference to FIG. 1.

Method 400 dedicates at least one wireless communication link to channel sounding as part of reducing latency in the multi-link wireless environment. Method 400 begins at 405 and proceeds to stage 410 where AP1 transmits a sounding trigger on a wireless link that is not dedicated to channel sounding (e.g., a non-dedicated sounding link). For example, AP1 may transmit an NDPA/NDP frame on the non-dedicated sounding link as a channel sounding alert to one or more of MLD1 and MLD2. At stage 415, AP1 transmits a CSI inquiry on another wireless link that is dedicated to channel sounding link (e.g., a dedicated sounding link). For example, AP1 may transmit a CBFR request on the dedicated sounding link to one or more of MLD1 and MLD2.

At stage 420, AP2 transmits a sounding trigger on a non-dedicated sounding link. For example, AP2 may transmit an NDPA/NDP frame on the non-dedicated link as a channel sounding alert to one or more of MLD1 and MLD2. At stage 425, AP1 receives a channel state quantification from one or more of MLD1 and MLD2 on the dedicated sounding link in response to its CSI inquiry. For example, AP1 may receive a CBFR frame from one or more of MLD1 and MLD2 with beamforming parameters on the dedicated sounding link.

At stage 430, AP2 transmits a CSI inquiry on the dedicated sounding link. For example, AP2 may transmit a CBFR request on dedicated sounding link. At stage 435, AP1 transmits data on the non-dedicated sounding link to one or more of MLD1 and MLD2. At stage 440, AP2 receives a channel state quantification from one or more of MLD1 and MLD2 on the dedicated sounding link in response to its CSI inquiry. At stage 445, AP2 transmits data (e.g., beamformed) on non-dedicated sounding link to one or more of MLD1 and MLD2 and method 400 ends at 450. In addition to reducing an amount of latency associated with the non-dedicated sounding link by using an alternative, dedicated link for channel sounding, method 400 may be used to reduce an amount of time attributed to channel sounding by concurrently transmitting CSI reports in the dedicated sounding link to coordinated APs.

FIG. 5 is an example transmission sequence 500 for an exemplary multi-AP channel sounding process in a multi-link wireless environment. For this example, Link 1 is a non-dedicated sounding link and Link 2 is a dedicated sounding link for AP 1. Likewise, AP 2 has established its own Link 1 as a non-dedicated sounding link and Link 2 as a dedicated sounding link. As shown in FIG. 5, transmission sequence 500 includes AP1 transmitting an NDPA in Link 1 to MLD1 and MLD2 at 502, AP1 transmitting NDP in Link 1 to MLD1 and MLD2 at 504, AP1 transmitting a BFRP Trigger/poll (e.g., a CBFR poll) in Link 2 to MLD1 and MLD2 at 506, and AP1 receiving CSI report(s) in Link 2 from MLD1 and MLD2 at 508.

As shown in FIG. 5, after NDP transmission from AP1, AP2 transmits NDPA in Link 1 to MLD1 and MLD2 at 510, AP2 transmits NDP in Link 1 to MLD1 and MLD2 at 512, AP2 transmits a BFRP Trigger/poll (e.g., a CBFR poll) in Link 2 to MLD1 and MLD2 at 514, and AP2 receives CSI report(s) concurrently in Link 2 from MLD1 and MLD2 at 516. While reducing latency in a non-dedicated channel sounding link (Link 1) by performing channel sounding in dedicated channel sounding link (Link 2), the exemplary transmission sequence 500 may also reduce the amount of time spent in channel sounding by coordinated APs in part by enabling a concurrent transmission of CSI reports 508, 516 in Link 2.

Figure 6:
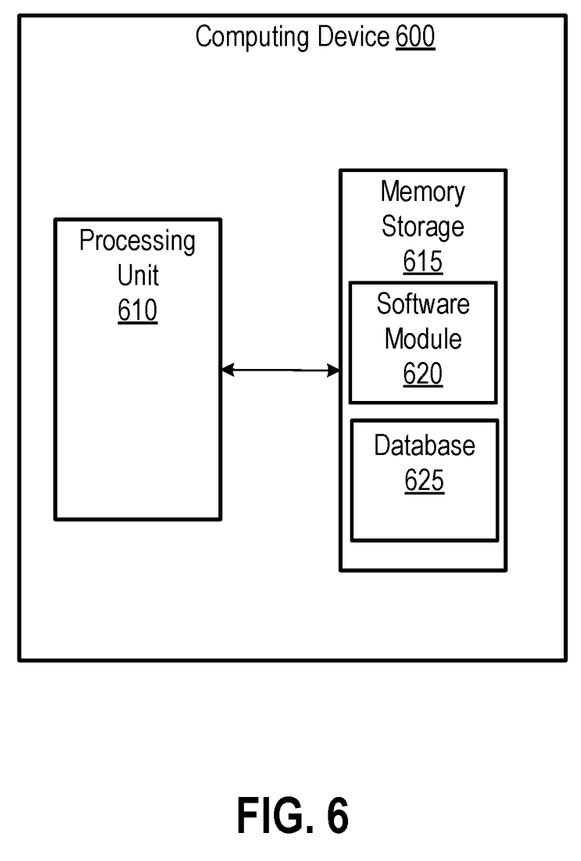
FIG. 6 is a block diagram of a computing device.

FIG. 6 shows computing device 600. As shown in FIG. 6, computing device 600 may include a processing unit 610 and a memory unit 615. Memory unit 615 may include a software module 620, database 625, and additional logic. While executing on processing unit 610, software module 620 may perform, for example, processes for providing channel sounding using a dedicated sounding link as described herein. Computing device 600, for example, may provide an operating environment for AP 102, MLD 104, AP1, AP2, MLD1, MLD2, etc. Other operational environments may be utilized and the present disclosure is not limited to computing device 600.

Computing device 600 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where elements may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A system comprising:
   a memory storage; and
   a processing unit coupled to the memory storage, wherein the processing unit is operative to:
   establish multiple wireless communication links with a same multi-link device (MLD), wherein the processing unit being operative to establish the multiple wireless communication links with the same MLD comprises the processing unit being operative to:
   establish a first wireless communication link with a MLD; and
   establish a second wireless communication link with the MLD;
   transmit a sounding trigger to the MLD via the first wireless communication link of the multiple wireless communication links;
   subsequent to transmission of the sounding trigger to the MLD via the first wireless communication link, transmit a channel state information (CSI) inquiry to the MLD via the second wireless communication link of the multiple wireless communication links; and
   receive, in response to the CSI inquiry transmitted to the MLD via the second wireless communication link, a channel state quantification from the MLD via the second wireless communication link; AND wherein the sounding trigger comprises a Null Data Packet Announcement (NDPA) and Null Data Packet (NDP) frame, wherein the CSI inquiry comprises a Compressed Beam Forming Report (CBFR) poll frame, and wherein the channel state quantification comprises a CBFR frame.

2. The system of claim 1, wherein the processing unit is further operative to:
   after receipt of the channel state quantification from the MLD via the second wireless communication link, transmit a data frame to the MLD tailored according to the channel state quantification from the MLD via the first wireless communication link; and
   in response to the transmitted data frame, receive an acknowledgment from the MLD via the first wireless communication link.

3. The system of claim 1, wherein the processing unit is further operative to transmit one or more data frames to one or more different MLDs via the first wireless communication link.

4. The system of claim 3, wherein the processing unit is further operative to receive channel state quantification from a different MLD via the second wireless communication link.

5. The system of claim 3, wherein the processing unit is further operative to transmit a data frame to a different MLD via the first wireless communication link while channel sounding with the MLD via the second wireless communication link.

6. The system of claim 1, further comprising a multi-link access point (AP) configured to support multiple MLDs.

7. The system of claim 6, wherein the multi-link AP is further configured to coordinate with different access points (APs) in a wireless network.

8. The system of claim 1, wherein the processing unit is further operative to communicate the CSI inquiry and the channel state quantification on the second wireless communication link to reduce an amount of latency associated with communications on the first wireless communication link.

9. A method comprising:
   establishing multiple wireless communication links with a same multi-link device (MLD), wherein establishing the multiple wireless communication links with the same MLD comprises:
   establishing a first wireless communication link with a MLD; and
   establishing a second wireless communication link with the MLD;
   transmitting a sounding trigger to the MLD via the first wireless communication link of the multiple wireless communication links;
   subsequent to transmitting the sounding trigger to the MLD via the first wireless communication link, transmitting a channel state information (CSI) inquiry to the MLD via the second wireless communication link of the multiple wireless communication links; and
   receiving, in response to the CSI inquiry transmitted to the MLD via the second wireless communication link, a channel state quantification from the MLD via the second wireless communication link; AND wherein the sounding trigger comprises a null data Null Data Packet Announcement (NDPA) and Null Data Packet (NDP) frame, wherein the CSI inquiry comprises a Compressed Beam Forming Report (CBFR) poll frame, and wherein the channel state quantification comprises a CBFR frame.

10. The method of claim 9, further comprising:
    after receiving the channel state quantification from the MLD via the second wireless communication link, transmitting a data frame to the MLD tailored according to the channel state quantification from the MLD via the first wireless communication link; and
    in response to the transmitted data frame, receiving an acknowledgment from the MLD via the first wireless communication link.

11. The method of claim 9, further comprising transmitting one or more data frames to one or more different MLDs via the first wireless communication link while performing channel sounding operations with the MLD on the second wireless communication link.

12. The method of claim 9, further comprising performing channel sounding in a multi-access point (AP) environment.

13. The method of claim 12, wherein a first AP of the multi-AP environment establishes the first and second wireless communication links, the method further comprising:
    transmitting, a sounding trigger from a second AP to the MLD via a third wireless communication link;
    subsequent to transmitting the sounding trigger from the second AP, transmitting a CSI inquiry from the second AP to the MLD via a fourth wireless communication link; and
    receiving, in response to the CSI inquiry transmitted from the second AP, a channel state quantification from the MLD via the fourth wireless communication link.

14. The method of claim 9, further comprising communicating the CSI inquiry and the channel state quantification on the second wireless communication link to reduce an amount of latency associated with communications on the first wireless communication link.

15. A non-transitory computer-readable medium that stores a set of instructions which when executed perform a method executed by the set of instructions comprising:

establishing multiple wireless communication links with a same multi-link device (MLD), wherein establishing the multiple wireless communication links with the same MLD comprises:
  establishing a first wireless communication link with a MLD; and
  establishing a second wireless communication link with the MLD;
transmitting a sounding trigger to the MLD via the first wireless communication link of the multiple wireless communication links;
subsequent to transmitting the sounding trigger to the MLD via the first wireless communication link, transmitting a channel state information (CSI) inquiry to the MLD via the second wireless communication link of the multiple wireless communication links; and
receiving, in response to the CSI inquiry transmitted to the MLD via the second wireless communication link, a channel state quantification from the MLD via the second wireless communication link; AND wherein the sounding trigger comprises a null data Null Data Packet Announcement (NDPA) and Null Data Packet (NDP) frame, wherein the CSI inquiry comprises a Compressed Beam Forming Report (CBFR) poll frame, and wherein the channel state quantification comprises a CBFR frame.

16. The non-transitory computer-readable medium of claim 15, further comprising:
  after receiving the channel state quantification from the MLD via the second wireless communication link, transmitting a data frame to the MLD tailored according to the channel state quantification from the MLD via the first wireless communication link; and
  in response to the transmitted data frame, receiving an acknowledgment from the MLD via the first wireless communication link.

17. The non-transitory computer-readable medium of claim 15, wherein a first AP of a multi-AP environment establishes the first and second wireless communication links, the method further comprising:
  transmitting, a sounding trigger from a second AP to the MLD via a third wireless communication link;
  subsequent to transmitting the sounding trigger from the second AP, transmitting a CSI inquiry from the second AP to the MLD via a fourth wireless communication link; and
  receiving, in response to the CSI inquiry transmitted from the second AP, a channel state quantification from the MLD via the fourth wireless communication link.

\* \* \* \* \*